(12) United States Patent
Hsu (10) Patent No.: US 9,425,657 B2
(45) Date of Patent: Aug. 23, 2016

(54) RELUCTANCE MOTOR SYSTEM, DRIVING CIRCUIT, AND RELUCTANCE MOTOR

(71) Applicants: Fu-Tzu Hsu, Taipei (TW); Mao-Ming Lin, Changhua County (TW); Chin-Tseng Wu, Changhua County (TW)

(72) Inventor: Fu-Tzu Hsu, Taipei (TW)

(73) Assignees: Fu-Tzu Hsu, Taipei (TW); Mao-Ming Lin, Changhua County (TW); Chin-Tseng Wu, Changhua County (TW)

( * ) Notice: Subject to any disclaimer, the term of this patent is extended or adjusted under 35 U.S.C. 154(b) by 0 days.

(21) Appl. No.: 14/486,034

(22) Filed: Sep. 15, 2014

(65) Prior Publication Data
US 2016/0079903 A1    Mar. 17, 2016

(51) Int. Cl.
| H02P 1/46 | (2006.01) |
|---|---|
| H02K 1/24 | (2006.01) |
| H02P 25/08 | (2016.01) |
| H02K 19/10 | (2006.01) |
| H02P 1/00 | (2006.01) |

(52) U.S. Cl.
CPC .............. *H02K 1/246* (2013.01); *H02K 19/103* (2013.01); *H02P 25/085* (2013.01); *H02P 1/00* (2013.01)

(58) Field of Classification Search
CPC ........................................................ H02P 25/08
USPC ............................................ 318/701, 139, 34
See application file for complete search history.

(56) References Cited

U.S. PATENT DOCUMENTS

| 6,051,903 A * | 4/2000 | Pengov | ................ | H02K 19/103 310/162 |
|---|---|---|---|---|
| 6,288,460 B1 * | 9/2001 | Fakult | ..................... | H02K 3/24 310/179 |
| 6,720,686 B1 * | 4/2004 | Horst | ..................... | H02K 29/03 310/254.1 |

* cited by examiner

*Primary Examiner* — David S Luo
(74) *Attorney, Agent, or Firm* — McNees Wallace & Nurick LLC (57) ABSTRACT

A reluctance motor system includes a reluctance motor having a stator and a rotor, and a driving circuit. The stator includes phase winding sets each of which includes two windings that are connected in series at a corresponding node. The driving circuit includes switching members each of which is coupled electrically to a respective phase winding set, and each of which includes a first switch, a second switch, a first flyback diode, and a second flyback diode. The driving circuit further includes damping capacitor sets each of which includes a first capacitor coupled between the node and a positive terminal of a DC power source, and a second capacitor coupled between the node and a negative terminal of the DC power source.

9 Claims, 7 Drawing Sheets

RELUCTANCE MOTOR SYSTEM, DRIVING CIRCUIT, AND RELUCTANCE MOTOR

BACKGROUND OF THE INVENTION

1. Field of the Invention

The invention relates to a direct current (DC) brushless motor, more particularly to a reluctance motor system.

2. Description of the Related Art

Figure 1:
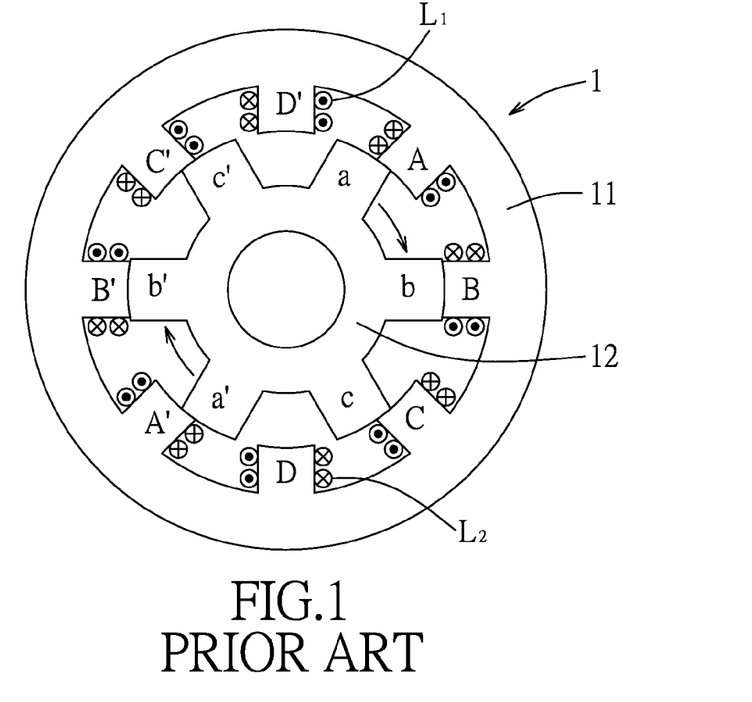
FIG. 1 is a schematic diagram illustrating a front view of a conventional reluctance motor.
Figure 2:
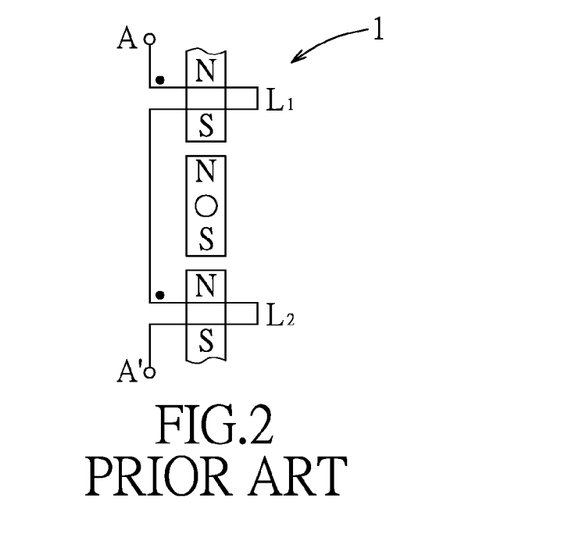
FIG. 2 is a schematic diagram illustrating a side view of the conventional reluctance motor.

Referring to FIG. 1 and FIG. 2, two schematic diagrams respectively illustrate a front view and a side view of a conventional reluctance motor 1. The conventional reluctance motor 1 includes a stator 11 and a rotor 12 surrounded by the stator 11. The stator 11 includes eight salient poles A, A', B, B', C, C', D and D', and four phase winding sets wound around the eight salient poles. Each of the phase winding sets includes a first winding $L_1$ and a second winding $L_2$ that are connected in series, and that are respectively wound around two of the salient poles of the stator 11 that are diametrically opposite to each other. For example, the first winding $L_1$ and the second winding $L_2$ of one of the phase winding sets are respectively wound around the salient poles A and A', the first winding $L_1$ and the second winding $L_2$ of another one of the phase winding sets are respectively wound around the salient poles B and B', and so forth. The rotor 12 includes six projecting poles a, a', b, b', c and c'.

Figure 3:
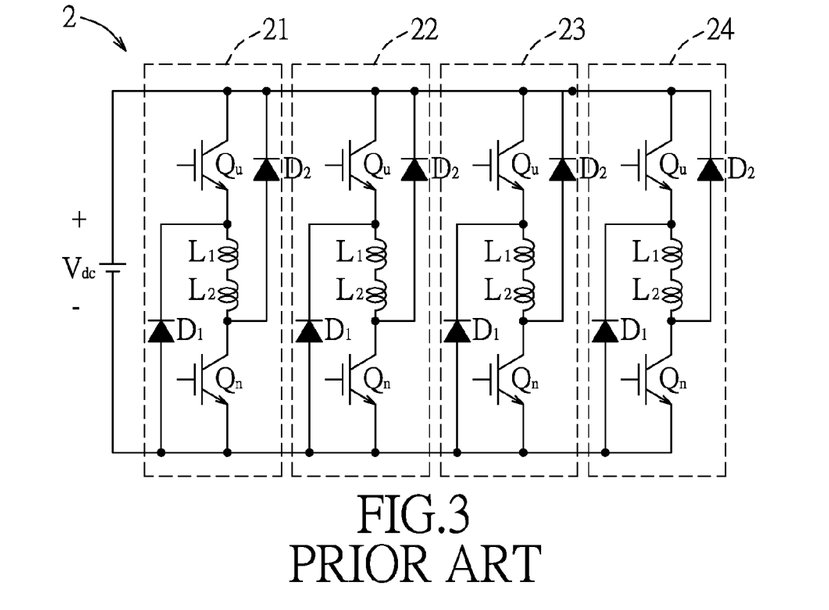
FIG. 3 is a circuit diagram illustrating a driving circuit which is for use with the conventional reluctance motor and which is coupled electrically to four phase winding sets of the conventional reluctance motor.

Referring to FIG. 3, a conventional driving circuit 2 for a reluctance motor is illustrated. The driving circuit 2 is to be coupled electrically to a direct current (DC) power source Vdc, and includes four switching members 21-24 that are connected in parallel with the DC power source Vdc. Each of the switching members 21-24 corresponds to a respective one of the four phase winding sets connected to the stator 11, and includes a first switch Qu coupled electrically to a first end of the respective phase winding set, a second switch Qn coupled electrically to a second end of the respective phase winding set opposite to the first end thereof, a first flyback diode $D_1$ with a cathode coupled electrically to the first end of the respective phase winding set and with an anode to be coupled electrically to a negative terminal of the DC power source, and a second flyback diode $D_2$ with a cathode to be coupled electrically to a positive terminal of the DC power source and with an anode coupled electrically to the second end of the respective phase winding set.

Figure 4:
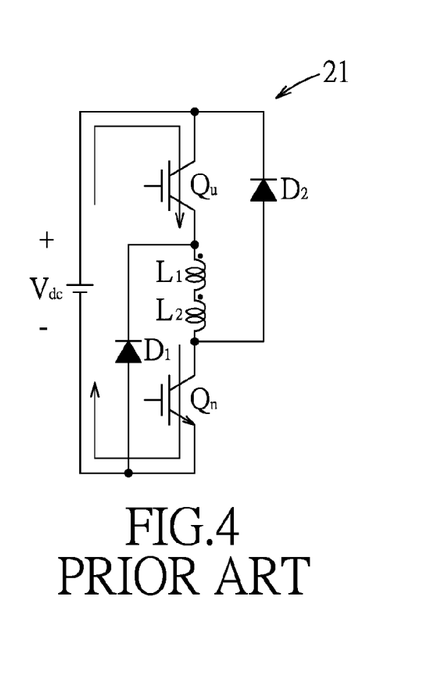
FIG. 4 is a circuit diagram illustrating one of switching members of the driving circuit which enables a corresponding one of the phase winding sets to form a current loop with a direct current (DC) power source.

The driving circuit 2 is used to excite the reluctance motor 1 in a split-phase manner by exciting the four phase winding sets in sequence, that is, the driving circuit 2 controls one of the switching members in a fundamental cycle. For example, referring to FIG. 4, when the first switch Qu and the second switch Qn of the switching member 21 are conducting, the first winding $L_1$ and the second winding $L_2$ of a corresponding one of the phase winding sets is configured to form a current loop with the DC power source Vdc, such that a magnetic field is generated at each of the salient poles A and A' around which the first and second windings $L_1$ and $L_2$ of the corresponding one of the phase winding sets are wound, so as to attract the projecting poles a and a' of the rotor 12 to move toward the salient poles A and A' of the stator 11, as best shown in FIG. 1. Subsequently, when the first switch Qu and the second switch Qn of the switching member 21 are not conducting, and when the first switch Qu and the second switch Qn of the switching member 22 are conducting, the first winding $L_1$ and the second winding $L_2$ of another corresponding one of the phase winding sets is configured to form a current loop with the DC power source Vdc, such that a magnetic field is generated at each of the salient poles B and B' around which the first and second windings $L_1$ and $L_2$ of said another corresponding one of the phase winding sets are wound, so as to attract the projecting poles b and b' of the rotor 12 to move toward the salient poles B and B' of the stator 11. Accordingly, when remaining two of the phase winding sets are sequentially excited in a similar manner, the rotor 12 may be driven to rotate clockwise. Alternatively, if the phase winding sets are sequentially excited in a reverse order, i.e., the phase winding sets wound around the salient poles D and D', C and C', B and B', and A and A' being excited in sequence, the rotor 12 may be driven to rotate counterclockwise.

Figure 5:
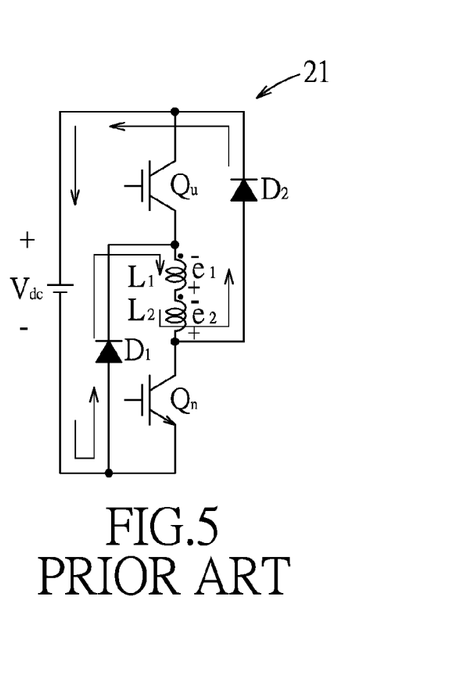
FIG. 5 is a circuit diagram illustrating that when the switching member of FIG. 4 disconnects the phase winding set from the DC power source, a current formed by a counter electromotive force that is induced at the phase winding set may charge the DC power source.

However, referring to FIG. 5, when the driving circuit 2 operates in the end of the aforementioned fundamental cycle, so that the first switch Qu and the second switch Qn of the switching member 21 are turned off to be not conducting, instantaneous counter electromotive forces (CEMF) e1 and e2 are induced respectively at the first winding $L_1$ and the second winding $L_2$ of the corresponding one of the phase winding sets. A high current is formed by the CEMFs e1 and e2, and flows via the first flyback diode $D_1$ and the second flyback diode $D_2$ which are coupled electrically between the corresponding one of the phase winding sets and the DC power source Vdc to charge the DC power source Vdc. In this way, the DC power source Vdc, such as a storage battery or a capacitor, is subjected to a high voltage impact, and is thus prone to overheating and burnout due to the instantaneous excessive input current.

Furthermore, structures of projecting poles of the stator 11 and the rotor 12 of the conventional reluctance motor 1 may cause significant cogging torque during a process of phase switching which may result in vibration and noise while the conventional reluctance motor 1 operates.

SUMMARY OF THE INVENTION

Therefore, an object of the present invention is to provide a driving circuit for a reluctance motor system and for a reluctance motor which is able to recycle counter electromotive forces induced at phase winding sets during a driving process.

Another object of the present invention is to provide a reluctance motor system and a reluctance motor which are able to reduce cogging torque during a process of phase switching, so as to lower vibration and noise while the reluctance motor operates.

In a first aspect of the present invention, a reluctance motor system is to be powered by a direct current (DC) power source, and comprises a reluctance motor and a driving circuit. The reluctance motor includes a stator and a rotor. The stator includes M phase winding sets. M is an integer not smaller than 3. Each of the phase winding sets includes a first winding and a second winding that are disposed at diametrically opposite positions of the stator, and that are connected in series at a corresponding node. The driving circuit includes M switching members and M damping capacitor. Each of the switching members is coupled electrically to a respective one of the phase winding sets. Each of the switching members includes a first switch coupled electrically to a first end of the respective phase winding set, a second switch coupled electrically to a second end of the respective phase winding set opposite to the first end thereof, a first flyback diode with a cathode coupled electrically to the first end of the respective phase winding set and with an anode to be coupled electrically to a negative terminal of the DC power source, and a second flyback diode with a cathode to be coupled electrically to a positive terminal of the DC power source and with an anode coupled electrically to the second end of the respective phase winding set. Each of the damping capacitor sets includes a first capacitor coupled electrically between the node at which the first and second windings of a respective one of the phase winding sets are connected and the positive terminal of the DC power source, and a second capacitor coupled electrically between the node at which the first and second windings of the respective one of the phase winding sets are connected and the negative terminal of the DC power source.

When the first switch and the second switch of one of the switching members are conducting, a corresponding one of the phase winding sets coupled electrically between the first and second switches of said one of the switching members is configured to form a current loop with the DC power source so as to generate a magnetic field for driving rotation of the rotor. When the first switch and the second switch of said one of the switching members are not conducting, an instantaneous counter electromotive force (CEMF) induced at the first winding of the corresponding one of the phase winding sets charges the second capacitor of a respective one of the damping capacitor sets via the first flyback diode of said one of the switching members, and an instantaneous CEMF induced at the second winding of the corresponding one of the phase winding sets charges the first capacitor of the respective one of the damping capacitor sets via the second flyback diode of said one of the switching members.

In a second aspect of the present invention, a driving circuit is for use with a reluctance motor that includes a stator and a rotor. The stator includes M phase winding sets. M is an integer not smaller than 3. Each of the phase winding sets includes a first winding and a second winding that are disposed at diametrically opposite positions of the stator, and that are connected in series at a corresponding node. The driving circuit is to be powered by a direct current (DC) power source, and comprises M switching members and M damping capacitor sets. Each of the switching members is to be connected in parallel with the DC power source and is to be coupled electrically to a respective one of the phase winding sets. Each of the switching members includes a first switch to be coupled electrically to a first end of the respective phase winding set, a second switch to be coupled electrically to a second end of the respective phase winding set opposite to the first end thereof, a first flyback diode with a cathode to be coupled electrically to the first end of the respective phase winding set and with an anode to be coupled electrically to a negative terminal of the DC power source, and a second flyback diode with a cathode to be coupled electrically to a positive terminal of the DC power source and with an anode to be coupled electrically to the second end of the respective phase winding set. Each of the damping capacitor sets includes a first capacitor to be coupled electrically between the node at which the first and second windings of a respective one of the phase winding sets are connected and the positive terminal of the DC power source, and a second capacitor to be coupled electrically between the node at which the first and second windings of the respective one of the phase winding sets are connected and the negative terminal of the DC power source.

When the first switch and the second switch of one of the switching members are conducting, a corresponding one of the phase winding sets coupled electrically between the first and second switches of said one of the switching members is configured to form a current loop with the DC power source so as to generate a magnetic field for driving rotation of the rotor. When the first switch and the second switch of said one of the switching members are not conducting, an instantaneous counter electromotive force (CEMF) induced at the first winding of the corresponding one of the phase winding sets charges the second capacitor of a respective one of the damping capacitor sets via the first flyback diode of said one of the switching members, and an instantaneous CEMF induced at the second winding of the corresponding one of the phase winding sets charges the first capacitor of the respective one of the damping capacitor sets via the second flyback diode of said one of the switching members.

In a third aspect of the present invention, a reluctance motor comprises a stator and a rotor. The stator includes 2×M salient poles and M phase winding sets. M is an integer not smaller than 3. Each of the phase winding sets includes a first winding and a second winding which are respectively wound around two of the salient poles of the stator that are diametrically opposite to each other, and which are connected in series. The rotor is surrounded by the stator, and includes 2×N projecting poles. N is an integer ranging from 2 to M. Each of the salient poles of the stator has a distal end that widens toward the rotor and that curves toward a direction away from the rotor to form a concave surface. Each of the projecting poles of the rotor has a distal end that widens toward the stator and that curves toward the stator to form a convex surface which corresponds in shape to the concave surface.

BRIEF DESCRIPTION OF THE DRAWINGS

Other features and advantages of the present invention will become apparent in the following detailed description of an embodiment with reference to the accompanying drawings, of which.

DETAILED DESCRIPTION OF THE EMBODIMENT

Figure 6:
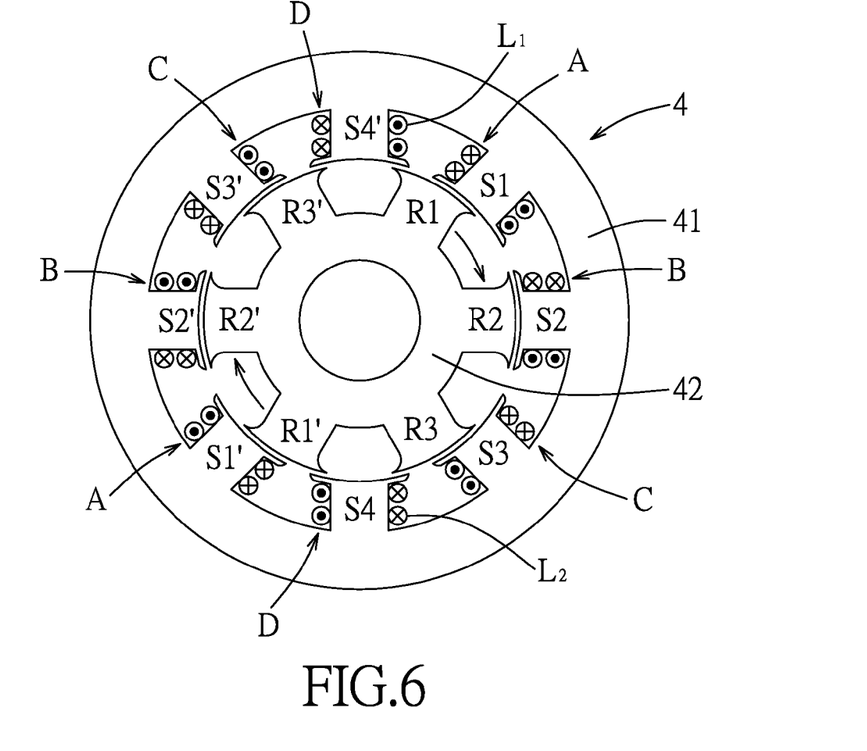
FIG. 6 is a schematic diagram illustrating a front view of an embodiment of a reluctance motor according to the present invention.
Figure 7:
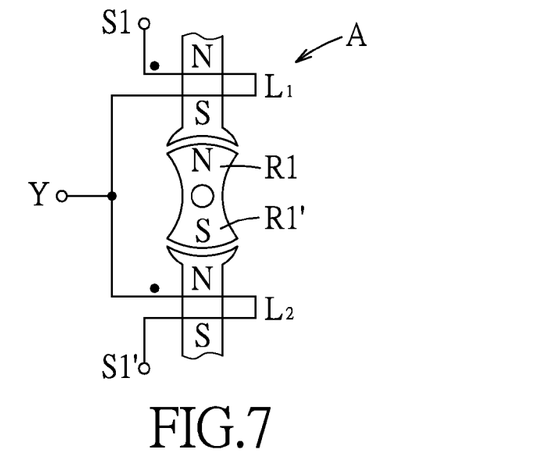
FIG. 7 is a schematic diagram illustrating a side view of the embodiment of the reluctance motor according to the present invention.

Referring to FIG. 6 and FIG. 7, two schematic diagrams respectively illustrate a front view and a side view of a reluctance motor 4 of an embodiment of a reluctance motor system according to the present invention. The reluctance motor 4 includes a stator 41 and a rotor 42 which is surrounded by the stator 41. The stator 41 includes 2×M salient poles which are disposed in an evenly spaced arrangement. M is an integer not smaller than 3. The stator 41 further includes M phase winding sets. In the embodiment, four is taken as an example for M (M=4). For example, each of the four phase winding sets A, B, C and D is respectively wound around two of the eight salient poles S1, S1', S2, S2', S3, S3', S4 and S4' of the stator 41. Each of the phase winding sets includes a first winding $L_1$ and a second winding $L_2$ which are wound around corresponding two of the eight salient poles that are diametrically opposite to each other, and which are connected in series at a corresponding node Y. For instance, the first winding $L_1$ and the second winding $L_2$ of the phase winding set A are respectively wound around the salient pole S1 and the salient pole S1', the first winding $L_1$ and the second winding $L_2$ of the phase winding set B are respectively wound around the salient pole S2 and the salient pole S2', and so forth. The rotor 42 includes 2×N projecting poles. N is an integer ranging from 2 to M. In this embodiment, N is equal to three (N=3), and the six projecting poles R1, R1', R2, R2', R3 and R3' are taken as an example.

Figure 8:
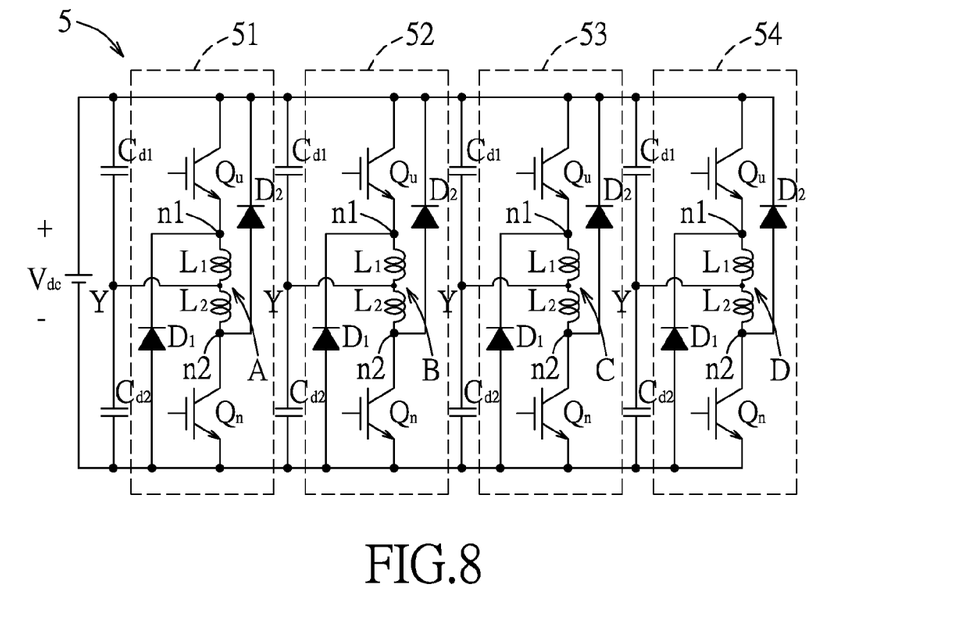
FIG. 8 is a circuit diagram illustrating a driving circuit which is for use with the reluctance motor of the present invention and which is coupled electrically to four phase winding sets of the reluctance motor.

Referring to FIG. 8, a circuit diagram illustrates a driving circuit 5 of the reluctance motor system according to the present invention which is for use with the reluctance motor 4 and which is coupled electrically to the four phase winding sets A to D of the reluctance motor 4. The driving circuit 5 is to be coupled electrically to a direct current (DC) power source Vdc, such as a storage battery. The driving circuit 5 includes M switching members 51-54 (M=4) each of which is to be connected in parallel with the DC power source Vdc, and each of which is coupled electrically to a respective one of the phase winding sets A to D. Each of the switching members, e.g., the switching member 51, includes a first switch Qu with a first terminal coupled electrically to a first end n1 of the respective phase winding set, e.g., the phase winding set A, a second switch Qn with a first terminal coupled electrically to a second end n2 of the respective phase winding set opposite to the first end n1 thereof, a first flyback diode $D_1$ with a cathode coupled electrically to the first end n1 of the respective phase winding set and with an anode to be coupled electrically to a negative terminal of the DC power source Vdc, and a second flyback diode $D_2$ with a cathode to be coupled electrically to a positive terminal of the DC power source Vdc and with an anode coupled electrically to the second end n2 of the respective phase winding set. For each of the switching members 51-54, the first switch Qu has a second terminal to be coupled electrically to the positive terminal of the DC power source Vdc, and the second switch Qn has a second terminal to be coupled electrically to the negative terminal of the DC power source Vdc.

The driving circuit 5 further includes M damping capacitor sets each of which includes a first capacitor $C_{d1}$ coupled electrically between the node Y at which the first and second windings $L_1$ and $L_2$ of a respective one of the phase winding sets are connected and the positive terminal of the DC power source Vdc, and a second capacitor $C_{d2}$ coupled electrically between the node Y at which the first and second windings $L_1$ and $L_2$ of the respective one of the phase winding sets are connected and the negative terminal of the DC power source Vdc.

Figure 9:
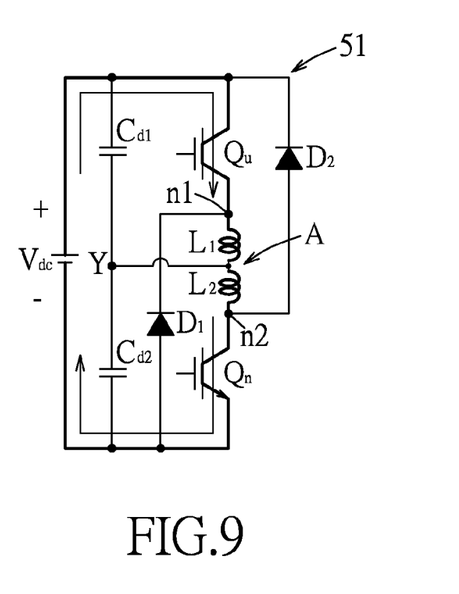
FIG. 9 is a circuit diagram illustrating one of switching members of the driving circuit which enables a corresponding one of the phase winding sets to form a current loop with a direct current (DC) power source.

In this embodiment, the driving circuit 5 is a switching controller which excites the reluctance motor 4 in a split-phase manner by exciting the four phase winding sets A, B, C and D of the reluctance motor 4 in sequence. For example, in an initial state of the reluctance motor 4 as shown in FIG. 6, the projecting poles R1 and R1' of the rotor 42 are closest in position to the salient poles S1 and S1' of the stator 41. The driving circuit 5 is configured to control one of the switching members in a fundamental cycle. For instance, referring to FIG. 9, when the first switch Qu and the second switch Qn of the switching member 51 coupled electrically to the phase winding set A are conducting, the first winding $L_1$ and the second winding $L_2$ of the phase winding set A are configured to form a current loop with the DC power source Vdc, such that a magnetic field is generated at each of the salient poles S1 and S1' of the stator 41 around which the first and second windings $L_1$ and $L_2$ of the phase winding set A are wound so as to attract a respective one of the projecting poles R1 and R1' of the rotor 42 to move toward the salient pole S1 or the salient pole S1' of the stator 41. Thereafter, the first switch Qu and the second switch Qn of the switching member 51 are switched to be not conducting. Subsequently, when the first switch Qu and the second switch Qn of the switching member 52 coupled electrically to the phase winding set B are conducting, the first winding $L_1$ and the second winding $L_2$ of the phase winding set B are configured to form a current loop with the DC power source Vdc, such that a magnetic field is generated at each of the salient poles S2 and S2' of the stator 41 around which the first and second windings $L_1$ and $L_2$ of the phase winding set B are wound so as to attract a respective one of the projecting poles R2 and R2' of the rotor 42 to move toward the salient pole S2 or the salient pole S2' of the stator 41. The phase winding sets C and D are also excited in a similar manner so that the rotor 42 is able to rotate clockwise. Alternatively, if the driving circuit 5 excites the phase winding sets D, C, B and A in sequence, the rotor 42 may be driven to rotate counterclockwise. In the meantime, during the fundamental cycle of excitation of one of the switching members, the first winding $L_1$ and the second winding $L_2$ of said one of the switching members is able to store electric energy.

Figure 10:
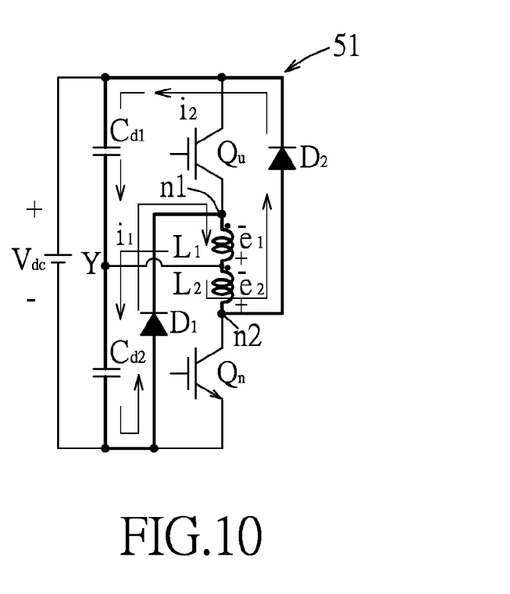
FIG. 10 is a circuit diagram illustrating that when the switching member of FIG. 9 disconnects the phase winding set from the DC power source, a current formed by a counter electromotive force that is induced at the phase winding set may charge a corresponding capacitor.

Accordingly, referring to FIG. 10, when the driving circuit 5 operates in the end of the aforementioned fundamental cycle and controls the first switch Qu and the second switch Qn of the switching member 51 coupled electrically to the phase winding set A to be not conducting, instantaneous counter electromotive forces (CEMF) e1and e2 are induced owing to the electric energy stored at the first winding $L_1$ and the second winding $L_2$ of the phase winding set A, respectively. A current $i_1$ formed by the CEMF e1 induced at the first winding $L_1$ flows via the second capacitor $C_{d2}$ coupled electrically between the node Y and the negative terminal of the DC power source Vdc, charges the second capacitor $C_{d2}$, and flows back to the first winding $L_1$ via the first flyback diode $D_1$ coupled between the first end n1 of the phase winding set A and the negative terminal of the DC power source Vdc. Meanwhile, a current $i_2$ formed by the CEMF e2 induced at the second winding $L_2$ flows via the second flyback diode $D_2$ coupled between the second end n2 of the phase winding set A and the positive terminal of the DC power source Vdc, flows to the first capacitor $C_{d1}$ coupled electrically between the node Y and the positive terminal of the DC power source Vdc, charges the first capacitor $C_{d1}$, and flows back to the second winding $L_2$.

In this way, in the instant when the first switch Qu and the second switch Qn of each of the switching members 51-54 are switched from conduction to non-conduction, an instantaneous high current which is formed by the CEMF induced at a respective of the phase winding sets may not flow through the DC power source Vdc, such that the DC power source Vdc may be prevented from a direct impact of the instantaneous high current. At the same time, energy of the CEMFs e1 and e2 induced at each of the phase winding sets may be stored in the second capacitor $C_{d2}$ and the first capacitor $C_{d1}$ of a respective one of the damping capacitor sets for subsequent usage without wasting the energy. Furthermore, for each of the phase winding sets, the CEMFs e1and e2 in a form of an alternating current (AC) induced respectively at the first winding $L_1$ and the second winding $L_2$ are able to charge respectively the second capacitor $C_{d2}$ and the first capacitor $C_{d1}$, via discharging paths formed by the first flyback diode $D_1$ and the second flyback diode $D_2$ coupled electrically to the first end n1 and the second n2 of the phase winding set, respectively, so as to release energy. In this way, the driving circuit 5 may not be operated in a high temperature, and the DC power source Vdc, such as the storage battery, may be free from burnout or a shorter lifetime due to the high temperature.

Moreover, since the four switching members 51-54 of the driving circuit 5 are switched to conduction in sequence so as to control the phase winding sets coupled electrically to a respective one of the switching members to form a current loop with the DC power source Vdc in turns, the rotor 42 may be propelled to rotate continuously. Therefore, when each of the phase winding sets is switched from forming the current loop with the DC power source Vdc to be not forming the current loop with the DC power source Vdc, the CEMFs induced at each of the phase winding sets are configured to charge the first capacitor $C_{d1}$ and the second capacitor $C_{d2}$ of a corresponding one of the damping capacitor sets which are coupled electrically to the node Y of a respective one of the switching members. Since a switching speed of the first switch Qu and the second switch Qn of each of the switching members 51-54 is relatively high, e.g., about 400 Hertz, a non-polarized medium frequency capacitor that is configured to operate within a frequency band ranging from 300 to 1000 Hertz may be used as the first capacitor $C_{d1}$ and the second capacitor $C_{d2}$ of each of the damping capacitor sets in the embodiment. Moreover, during a period when the driving circuit 5 is operating, the phase winding sets are configured to charge the first and second capacitors $C_{d1}$ and $C_{d2}$ of a respective one of the damping capacitor sets in turns, such that the first and second capacitors $C_{d1}$ and $C_{d2}$ remains fully-charged.

Accordingly, for each of the damping capacitor sets, when a voltage across a series connection of the first capacitor $C_{d1}$ and the second capacitor $C_{d2}$ that is coupled electrically between the positive terminal and the negative terminal of the DC power source Vdc is greater than a voltage of the DC power source Vdc, e.g., the storage battery, the first capacitor $C_{d1}$ and the second capacitor $C_{d2}$ are configured to charge the storage battery timely, so as to boost the duration of power supply of the DC power source Vdc. As a result, when the embodiment of the reluctance motor system is applied in an electric vehicle, such as an electric motor car, the endurance of the electric motor car may be extended. Further, when the reluctance motor 4 is desired to instantaneously output a high torque, for example, the electric motor car is accelerating or climbing, the first and second capacitors $C_{d1}$ and $C_{d2}$ are configured to provide electricity required by the reluctance motor 4 such that the electric motor car may have a better performance.

Figure 11:
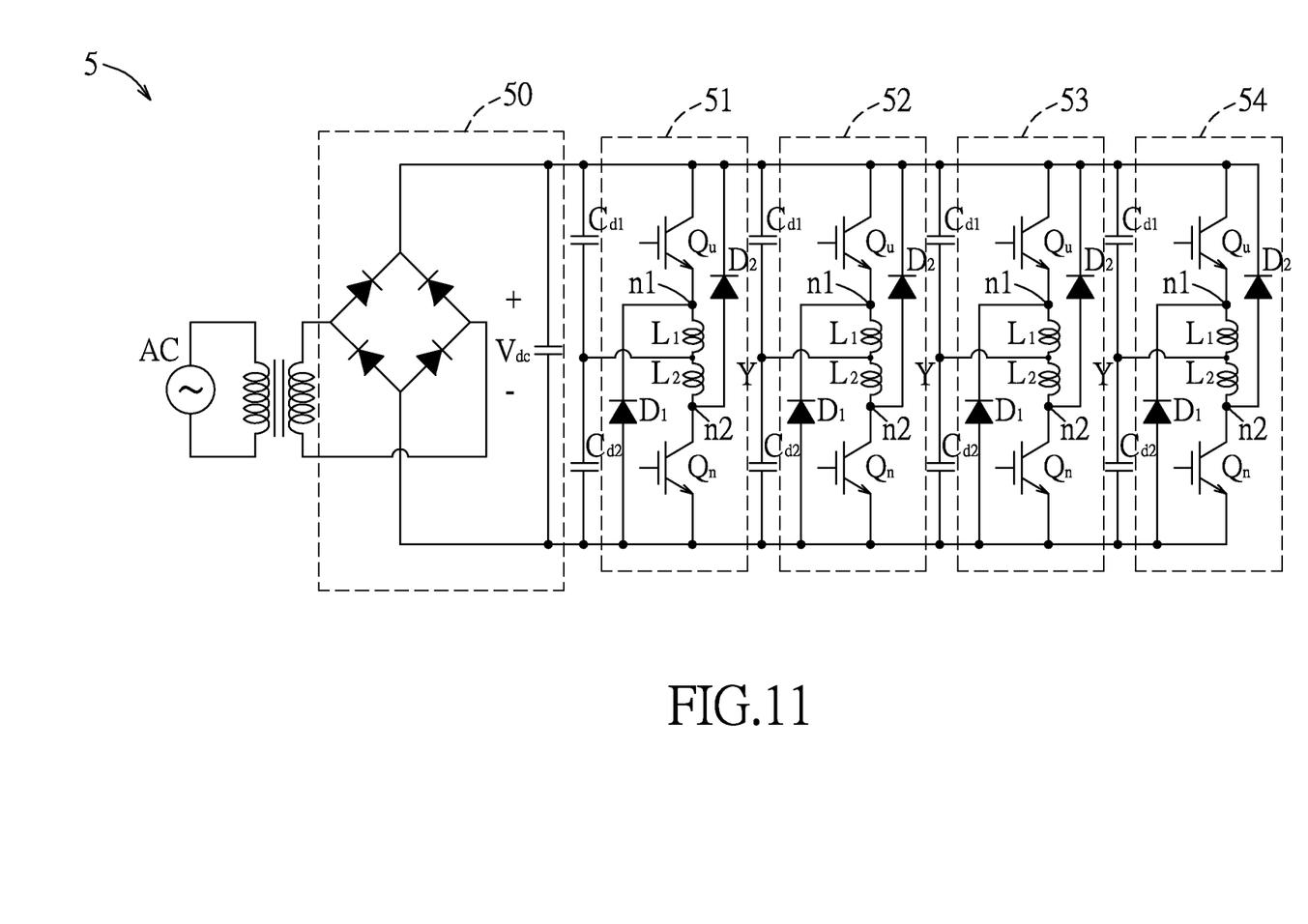
FIG. 11 is a circuit diagram illustrating a rectifier-filter circuit of the present invention which is coupled between the DC power source and the driving circuit.

It is noted that, the driving circuit 5 of the embodiment, aside from using the DC power source Vdc directly, may also utilize an AC power source. Referring to FIG. 11, the reluctance motor system may further comprise a rectifier-filter circuit which is coupled electrically between the driving circuit 5 and an AC power source, such as a conventional bridge rectifier-filter circuit 50. The conventional bridge rectifier-filter circuit 50 rectifies and filters an AC output of the AC power source to serve as the DC power source that powers the driving circuit 5 of the reluctance motor system. In this way, the embodiment of the reluctance motor system is for use with an electrical apparatus powered by an AC power, such as an air conditioner or a heat pump, so as to achieve an object of saving the AC power.

Figure 12:
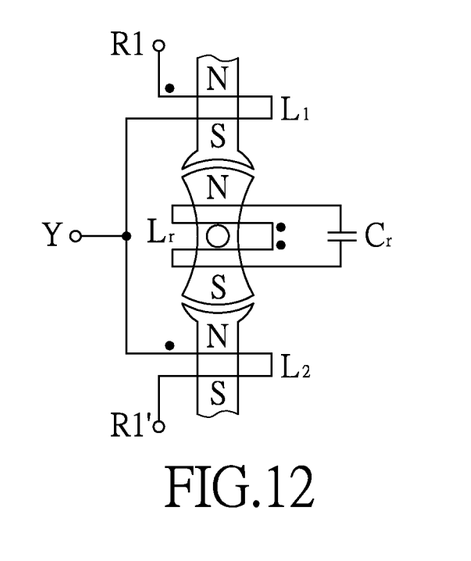
FIG. 12 is a schematic diagram illustrating aside view of the embodiment of the reluctance motor which further includes a resonant inductor and a resonant capacitor connected in parallel with the resonant inductor.
Figure 13:
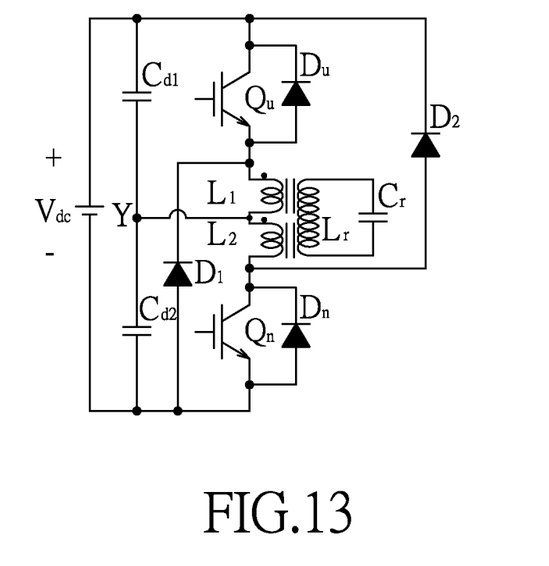
FIG. 13 is an equivalent circuit diagram illustrating that one of the phase winding sets corresponds in position to the resonant inductor.

Referring to FIG. 12 and FIG. 13, in a variation of the embodiment, the driving circuit 5 further includes N resonant inductors, and N resonant capacitors each of which is connected in parallel with a respective one of the resonant inductors. Each of the resonant capacitors is wound around two of the projecting poles of the rotor 42 that are diametrically opposite to each other. For example, the resonant inductor Lr is wound around the projecting poles R1 and R1', and the resonant capacitor Cr is connected in parallel with the resonant inductor Lr. When the projecting poles R1 and R1' are moved adjacent to the diametrically opposite salient poles S1 and S1' of the stator 41, the resonant inductor Lr corresponds in position to the first winding $L_1$ and the second winding $L_2$ that are respectively wound around the salient poles S1 and S1', as best shown in FIG. 13. The driving circuit 5 further includes M third flyback diodes Du each of which is inversely connected in parallel with the first switch Qu of a respective one of the switching members 51-54, and M fourth flyback diodes Qn each of which is inversely connected in parallel with the second switch Qn of a respective one of the switching members 51-54.

Figure 14:
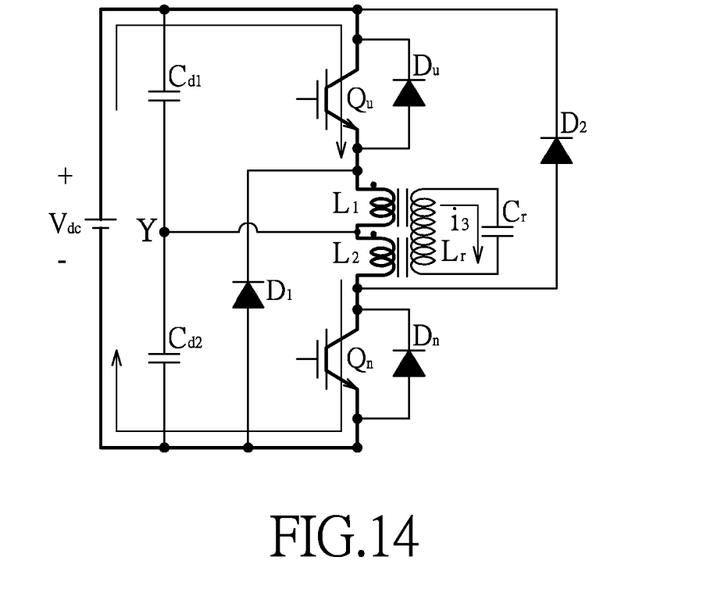
FIG. 14 is an equivalent circuit diagram illustrating that when the switching member of FIG. 13 enables the phase winding set to form a current loop with the DC power source, a current flow is induced in the resonant inductor and charges the resonant capacitor.

Referring to FIG. 14 in combination with FIG. 6, the first switch Qu and the second switch Qn of one of the switching members of the driving circuit 5 are switched to conduction so that the corresponding one of the phase winding sets, such as the phase winding set A coupled electrically to the switching member 51, is configured to form the current loop with the DC power source Vdc. In this way, an electric current from the DC power source Vdc flows via the first winding $L_1$ and the second winding $L_2$ of the phase winding set A so as to generate a magnetic field for attracting the projecting poles R1 and R1' of the rotor 42 to move toward the salient poles S1 and S1' of the stator 41. Meanwhile, a current flow $i_3$ is induced in the resonant inductor Lr wound around the projecting poles R1 and R1' of the rotor 42 according to the electromagnetic field generated at the first winding $L_1$ and the second winding $L_2$, and charges the resonant capacitor Cr.

Figure 15:
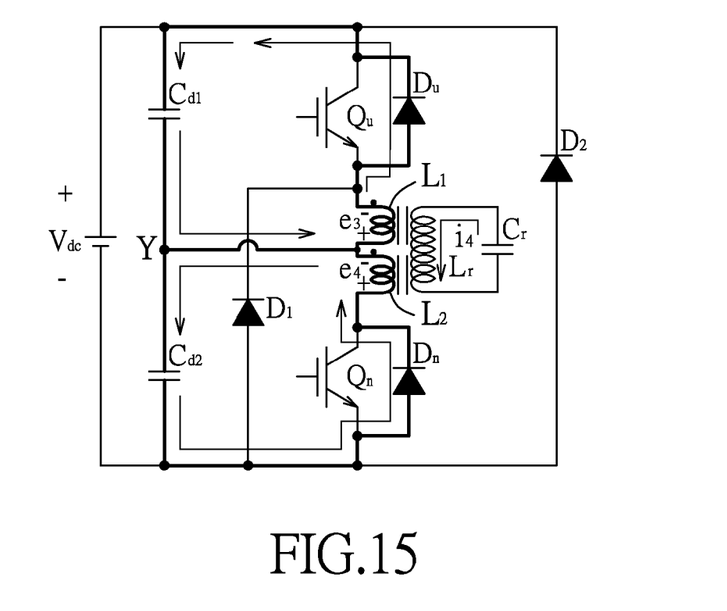
FIG. 15 is an equivalent circuit diagram illustrating that when the switching member of FIG. 14 disconnects the phase winding set from the DC power source, the resonant capacitors discharges electricity into the resonant inductor, such that a current flow is induced in each of a first winding and a second winding for charging the corresponding capacitor.

Referring to FIG. 15, when the first switch Qu and the second switch Qn of the switching member 51 are switched to non-conduction so that the phase winding set A coupled electrically to the switching member 51 is not configured to form the current loop with the DC power source, the resonant capacitors Cr is configured to discharge electricity into the resonant inductor Lr, such that a voltage e3 or e4 is induced in each of the first winding $L_1$ and the second winding $L_2$ which are respectively wound around the salient poles S1 and S1' of the stator 41 according to a discharging current $L_4$ flowing through the resonant inductor Lr. A current flow is formed by the voltage e3 induced in the first winding $L_1$ of the phase winding set A, flows via the third flyback diode Du which is inversely connected in parallel with the first switch Qu of the switching member 51, and charges the first capacitor $C_{d1}$ which is coupled electrically between the node Y of the phase winding set A and the positive terminal of the DC power source Vdc. In the meantime, a current flow is formed by the voltage e4 induced in the second winding $L_2$ of the phase winding set A, charges the second capacitor $C_{d2}$ which is coupled electrically between the node Y of the phase winding set A and the negative terminal of the DC power source Vdc, and flows back to the second winding $L_2$ via the fourth flyback diode Dn which is inversely connected in parallel with the second switch Qn of the switching member 51.

Accordingly, during a period when the rotor 42 is rotating, the rotor 42 is capable of generating electric power by means of the resonant inductors Lr each of which is wound around two of the projecting poles R1 and R1', R2 and R2', R3 and R3', or R4 and R4' of the rotor 42 that are diametrically opposite to each other, and the resonant capacitors Cr. The electric power thus generated may be stored in the first and second capacitors $C_{d1}$ and $C_{d2}$ of each of the damping capacitor sets via a corresponding one of the phase winding sets of the stator 41 and the third and fourth flyback diodes Du and Dn that are coupled electrically between the corresponding one of the phase winding sets and the first and second capacitors $C_{d1}$ and $C_{d2}$, respectively, so as to further boost the duration of power supply of the DC power source Vdc (the storage battery).

Furthermore, referring once again to FIG. 6 and FIG. 7, each of the salient poles S1, S1', S2, S2', S3, S3', S4 and S4' of the stator 41 has a distal end that widens toward the rotor 42 and that curves toward a direction away from the rotor 42 to form a concave surface. Each of the projecting poles R1, R1', R2, R2', R3, R3', R4 and R4' of the rotor 42 has a distal end that widens toward the stator 41 and that curves toward the stator 41 to form a convex surface which corresponds in shape to the concave surface. By virtue of such configuration, an area of interaction between the distal end of each of the salient poles S1, S1', S2, S2', S3, S3', S4 and S4' of the stator 41 and the distal end of a respective one of the projecting poles R1, R1', R2, R2', R3, R3', R4 and R4' of the rotor 42 may be broadened. Moreover, a distance between any adjacent two of the distal ends of the salient poles S1, S1', S2, S2', S3, S3', S4 and S4' of the stator 41 may be shortened, such that the cogging torque during a process of phase switching of the reluctance motor 4 may be effectively reduced so as to lower vibration and noise while the reluctance motor 4 operates.

Preferably, the stator 41 of the embodiment is made of a reactive and amorphous metallic material which is conductive along the diametrical direction. The material has a loose coupling characteristic so that a temperature of the stator 41 may be reduced, and performance of the reluctance motor 4 may be promoted.

To sum up, in the embodiment of the present invention, the first and second capacitors $C_{d1}$ and $C_{d2}$ of each of the damping capacitor sets are coupled electrically between the node Y of a respective one of the phase winding sets and the positive terminal and the negative terminal of the DC power source Vdc, respectively, such that when one of the switching members is switched from conduction to non-conduction, an instantaneous CEMF induced at a corresponding one of the phase winding sets which is coupled electrically to said one of the switching members is able to charge the first and second capacitors $C_{d1}$ and $C_{d2}$ timely via the first and second flyback diodes $D_1$ and $D_2$ that are coupled electrically to the first and second ends n1 and n2 of said corresponding one of the phase winding sets, respectively, without impacting the DC power source Vdc. Further, the electric power stored in the first and second capacitors $C_{d1}$ and $C_{d2}$ may be eventually utilized to charge the DC power source Vdc, so as to extend the duration of power supply of the DC power source Vdc, and so as to provide sufficient power to the reluctance motor 4 while the reluctance motor 4 is desired to instantaneously output a high torque. Moreover, by virtue of the resonant inductors Lr each of which is wound around two of the projecting poles of the rotor 42 that are diametrically opposite to each other, and the resonant capacitors Cr each of which is connected in parallel with a respective one of the resonant inductors Lr, the rotor 42 is capable of generating electric power according to the current flow in each of the phase winding sets of the stator 41 while the rotor 42 is rotating. The electric power thus generated may be stored in the first and second capacitors $C_{d1}$ and $C_{d2}$ via a corresponding one of the phase winding sets, so as to further extend the duration of power supply of the DC power source Vdc. In the embodiment, the distal end of each of the salient poles of the stator 41 widens toward the rotor 42 and forms a concave surface, and the distal end of each of the projecting poles of the rotor 42 widens toward the stator 41 and forms a convex surface which corresponds in shape to the concave surface, such that the cogging torque during a process of phase switching of the reluctance motor 4 may be effectively reduced so as to lower vibration and noise while the reluctance motor 4 operates.

While the present invention has been described in connection with what is considered the most practical embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A reluctance motor system to be powered by a direct current (DC) power source and comprising:
   a reluctance motor including a stator and a rotor, said stator including M phase winding sets, M being an integer not smaller than 3, each of said phase winding sets including a first winding and a second winding that are disposed at diametrically opposite positions of said stator, and that are connected in series at a corresponding node; and
   a driving circuit including
      M switching members each of which is coupled electrically to a respective one of said phase winding sets, and each of which includes a first switch coupled electrically to a first end of said respective phase winding set, a second switch coupled electrically to a second end of said respective phase winding set opposite to the first end thereof, a first flyback diode with a cathode coupled electrically to the first end of said respective phase winding set and with an anode to be coupled electrically to a negative terminal of the DC power source, and a second flyback diode with a cathode to be coupled electrically to a positive terminal of the DC power source and with an anode coupled electrically to the second end of said respective phase winding set, and M damping capacitor sets each of which includes a first capacitor coupled electrically between the node at which said first and second windings of a respective one of said phase winding sets are connected and the positive terminal of the DC power source, and a second capacitor coupled electrically between the node at which said first and second windings of the respective one of said phase winding sets are connected and the negative terminal of the DC power source;

wherein when said first switch and said second switch of one of said switching members are conducting, a corresponding one of said phase winding sets coupled electrically between said first and second switches of said one of said switching members is configured to form a current loop with the DC power source so as to generate a magnetic field for driving rotation of said rotor; and wherein when said first switch and said second switch of said one of said switching members are not conducting, an instantaneous counter electromotive force (CEMF) induced at said first winding of the corresponding one of said phase winding sets charges said second capacitor of a respective one of said damping capacitor sets via said first flyback diode of said one of said switching members, and an instantaneous CEMF induced at said second winding of the corresponding one of said phase winding sets charges said first capacitor of the respective one of said damping capacitor sets via said second flyback diode of said one of said switching members.

2. The reluctance motor system according to claim 1, the DC power source being a storage battery, wherein, for each of said damping capacitor sets, when a voltage across a series connection of said first capacitor and said second capacitor is greater than a voltage of the storage battery, said first capacitor and said second capacitor are configured to charge the storage battery.

3. The reluctance motor system according to claim 1, further comprising a rectifier-filter circuit which is coupled electrically between said driving circuit and an alternating current (AC) power source, and which rectifies and filters an AC output of the AC power source to serve as the DC power source that powers said reluctance motor system.

4. The reluctance motor system according to claim 1, wherein at least one of said first capacitor and said second capacitor of each of said damping capacitor sets is a non-polarized medium frequency capacitor that is configured to operate within a frequency band ranging from 300 to 1000 Hertz.

5. The reluctance motor system according to claim 1, wherein said stator includes 2×M salient poles, said first winding and said second winding of each of said phase winding sets being respectively wound around two of said salient poles of said stator that are diametrically opposite to each other, said rotor including 2×N projecting poles, N being an integer ranging from 2 to M.

6. The reluctance motor system according to claim 5, wherein said driving circuit further includes:

N resonant inductors each of which is wound around two of said projecting poles of said rotor that are diametrically opposite to each other;

N resonant capacitors each of which is connected in parallel with a respective one of said resonant inductors;

M third flyback diodes each of which is inversely connected in parallel with said first switch of a respective one of said switching members; and M fourth flyback diodes each of which is inversely connected in parallel with said second switch of a respective one of said switching members;

wherein when said first switch and said second switch of one of said switching members of said driving circuit are conducting so that the corresponding one of said phase winding sets coupled electrically between said first and second switches of said one of said switching members is configured to form the current loop with the DC power source, a current flow is induced in one of said resonant inductors wound around two of said projecting poles of said rotor that are diametrically opposite to each other and that are adjacent in position to the corresponding one of said phase winding sets, and charges a corresponding one of said resonant capacitors; and wherein when said first switch and said second switch of said one of said switching members are not conducting so that the corresponding one of said phase winding sets coupled electrically between said first and second switches of said one of said switching members is not configured to form the current loop with the DC power source, the corresponding one of said resonant capacitors discharges electricity into said one of said resonant inductors, such that a current flow is induced in said first winding of the corresponding one of said phase winding sets and charges said first capacitor of a respective one of said damping capacitor sets via said third flyback diode which is inversely connected in parallel with said first switch of said one of said switching members, and such that a current flow is induced in said second winding of the corresponding one of said phase winding sets and charges said second capacitor of the respective one of said damping capacitor sets via said fourth flyback diode which is inversely connected in parallel with said second switch of said one of said switching members.

7. The reluctance motor system according to claim 5, wherein each of said salient poles of said stator has a distal end that widens toward said rotor and that curves toward a direction away from said rotor to form a concave surface; and wherein each of said projecting poles of said rotor has a distal end that widens toward said stator and that curves toward said stator to form a convex surface which corresponds in shape to said concave surface.

8. A driving circuit for a reluctance motor, the reluctance motor including a stator and a rotor, the stator including M phase winding sets, M being an integer not smaller than 3, each of the phase winding sets including a first winding and a second winding that are disposed at diametrically opposite positions of the stator, and that are connected in series at a corresponding node, said driving circuit to be powered by a direct current (DC) power source, and comprising:

M switching members each of which is to be connected in parallel with the DC power source and each of which is to be coupled electrically to a respective one of the phase winding sets, each of said switching members including a first switch to be coupled electrically to a first end of the respective phase winding set, a second switch to be coupled electrically to a second end of said respective phase winding set opposite to the first end thereof, a first flyback diode with a cathode to be coupled electrically to the first end of said respective phase winding set and with an anode to be coupled electrically to a negative terminal of the DC power source, and a second flyback diode with a cathode to be coupled electrically to a positive terminal of the DC power source and with an anode to be coupled electrically to the second end of said respective phase winding set; and M damping capacitor sets each of which includes a first capacitor to be coupled electrically between the node at which the first and second windings of a respective one of the phase winding sets are connected and the positive terminal of the DC power source, and a second capacitor to be coupled electrically between the node at which the first and second windings of the respective one of the phase winding sets are connected and the negative terminal of the DC power source;

wherein when said first switch and said second switch of one of said switching members are conducting, a corresponding one of the phase winding sets coupled electrically between said first and second switches of said one of said switching members is configured to form a current loop with the DC power source so as to generate a magnetic field for driving rotation of the rotor; and wherein when said first switch and said second switch of said one of said switching members are not conducting, an instantaneous counter electromotive force (CEMF) induced at the first winding of the corresponding one of the phase winding sets charges said second capacitor of a respective one of said damping capacitor sets via said first flyback diode of said one of said switching members, and an instantaneous CEMF induced at the second winding of the corresponding one of the phase winding sets charges said first capacitor of the respective one of said damping capacitor sets via said second flyback diode of said one of said switching members.

9. A reluctance motor comprising:

a stator including 2×M salient poles and M phase winding sets, M being an integer not smaller than 3, each of said phase winding sets including a first winding and a second winding which are respectively wound around two of said salient poles of said stator that are diametrically opposite to each other, and which are connected in series;

a rotor surrounded by said stator and including 2×N projecting poles, N being an integer ranging from 2 to M;

N resonant inductors each of which is wound around two of said projecting poles of said rotor that are diametrically opposite to each other; and N resonant capacitors each of which is connected in parallel with a respective one of said resonant inductors; and wherein each of said salient poles of said stator has a distal end that widens toward said rotor and that curves toward a direction away from said rotor to form a concave surface;

wherein each of said projecting poles of said rotor has a distal end that widens toward said stator and that curves toward said stator to form a convex surface which corresponds in shape to said concave surface.

* * * * *